US006808376B2

(12) United States Patent
Serener-Thielmann

(10) Patent No.: US 6,808,376 B2
(45) Date of Patent: Oct. 26, 2004

(54) VULCANIZATION MOLD FOR THE MANUFACTURE OF TECHNICAL RUBBER PRODUCTS AND A BLOCKING MEMBER FOR USE THEREIN

(75) Inventor: Tayfun Serener-Thielmann, Wiesbaden (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 170 days.

(21) Appl. No.: 10/293,152

(22) Filed: Nov. 13, 2002

(65) Prior Publication Data

US 2003/0091671 A1 May 15, 2003

(30) Foreign Application Priority Data

Nov. 14, 2001 (DE) .......................................... 101 55 931

(51) Int. Cl.[7] .............................................. B29C 33/10
(52) U.S. Cl. ....................... 425/28.1; 249/141; 425/812
(58) Field of Search ................................ 425/28.1, 812; 249/141

(56) References Cited

U.S. PATENT DOCUMENTS

| 3,377,662 A | * | 4/1968 | Toshio ........................ 425/28.1 |
| 4,795,331 A | * | 1/1989 | Cain et al. .................. 425/28.1 |
| 5,585,064 A | | 12/1996 | Moris-Herbeuval et al. ..... 264/501 |
| 6,561,779 B2 | * | 5/2003 | Nitsch et al. ............... 425/28.1 |
| 2002/0051829 A1 | | 5/2002 | Nitsch et al. ............... 425/28.1 |

FOREIGN PATENT DOCUMENTS

CA 2.190720 5/1997

* cited by examiner

*Primary Examiner*—James P. Mackey
(74) *Attorney, Agent, or Firm*—June E. Rickey; David L. King

(57) ABSTRACT

A vulcanization mold is described for the manufacture of technical rubber products comprising a plurality of vent bores in which a blocking member is mounted which consists of a central body and a sealing part coupled to it which together form at least one angled flow path for air to be dissipated, with the central body being fixed in the vent bores, on the one hand, by clamping ribs provided at the central body and, on the other hand, by blocking elements which are formed at spring limbs of the sealing part.

10 Claims, 3 Drawing Sheets

Figure 1:
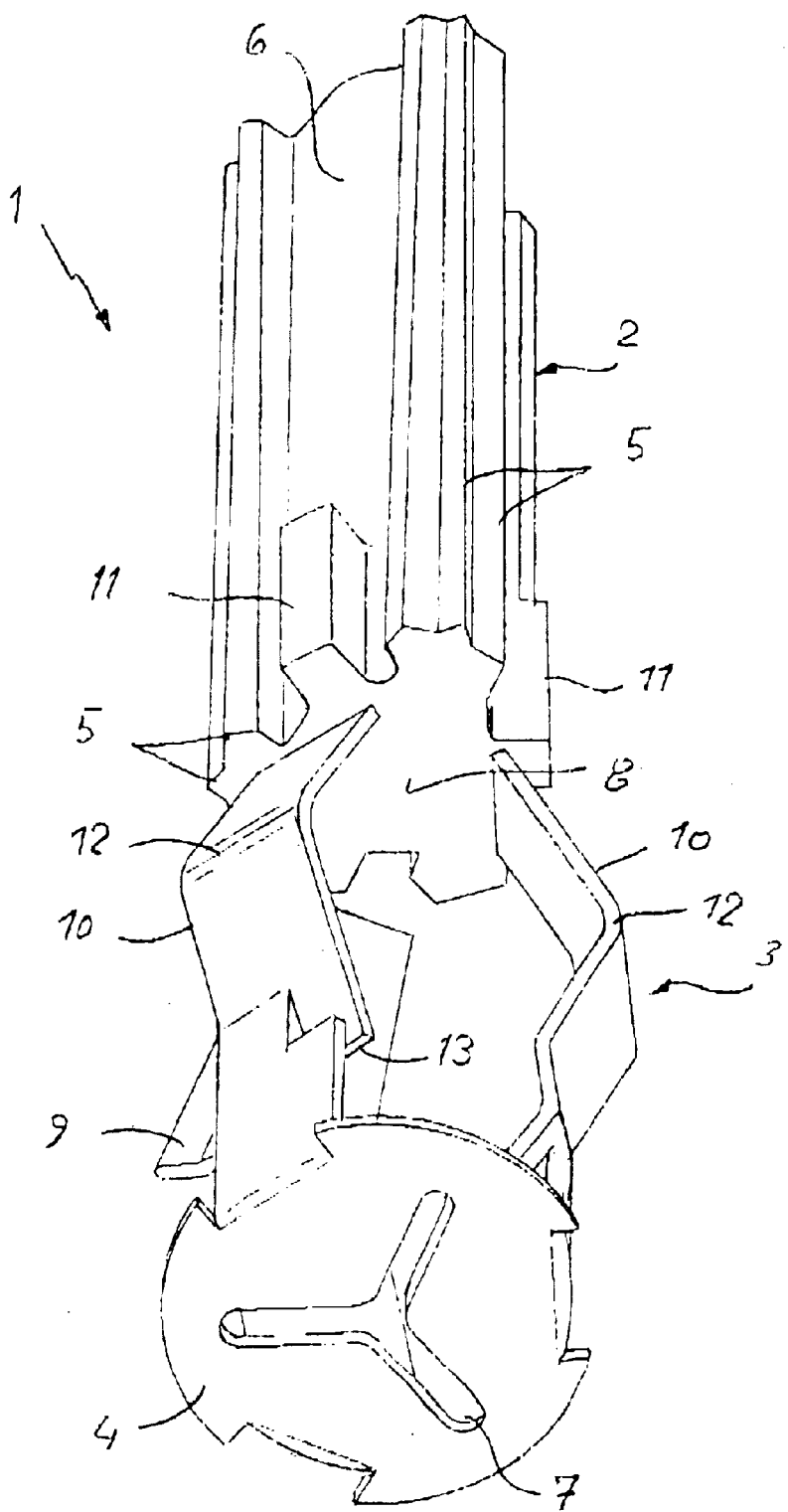

VULCANIZATION MOLD FOR THE MANUFACTURE OF TECHNICAL RUBBER PRODUCTS AND A BLOCKING MEMBER FOR USE THEREIN

FIELD OF THE INVENTION

The invention relates to a vulcanization mold for the manufacture of technical rubber products, in particular for the manufacture of vehicle tires, comprising a plurality of vent bores in each of which a blocking member is mounted which at least substantially blocks the penetration of (tire) blank material, the blocking member having a central body which can be fixed in a force-transmitting manner in the respective vent bore, and also a sealing part coupled to the central body and having a surface region disposed toward the inner side of the mold which is provided with at least one aperture and which, together with the central body, forms at least one angled flow path for the air following the aperture. Furthermore, the invention relates to a blocking member for use in such a vulcanization mold.

BRIEF DESCRIPTION OF THE PRIOR ART

A vulcanization mold of the above named kind is known from the international application PCT/EP99/05323. This vulcanization mold has proven itself in practice and makes possible, for example, the manufacture of spue free vehicle tires, i.e. tires without bristles or spues at positions corresponding to the positions of vents in the tire mold. It is noted that the bristles or spues are sometimes referred to as sprues or shoots.

PRINCIPAL OBJECT OF THE INVENTION

It is the principal object of the present invention to further improve the proven solution described above, and indeed in particular with respect to the venting capability and the mechanical fixation of the blocking members in the respective receiving bores.

BRIEF DESCRIPTION OF THE INVENTION

Starting from the initially mentioned vulcanization mold, the above object is essentially satisfied, in accordance with the present invention, in that the central body is fixed in the respective vent bore, on the one hand, by clamping ribs provided at its outer periphery which cooperate with the bore wall and, on the other hand, by blocking elements which are formed on spring limbs of the sealing part provided for the coupling to the central body and which have a barb function with respect to the bore wall in the direction of the inner side of the mold.

In this manner a stable seating of the blocking members in the vent bores is achieved using constructionally simple measures such that, on removal of the respectively manufactured rubber product from the mold, there is no risk of the blocking members being fully or partly pulled out of the vent bores. The mounting of the blocking members is sufficiently stable that there is no risk of the blocking members being fully or partly pulled out of the vent bores even if some rubber material should penetrate into the blocking member and be fully vulcanized while engaging behind part regions of the blocking member. It is of special importance here that the technical measures necessary to ensure this secure hold can be realized very simply and at a favorable cost and nevertheless do not make the introduction of the blocking members into the corresponding vent bores more difficult.

Furthermore, the design has the advantage that the blocking members can still be readily exchanged despite the stable seating in the vent bores.

Particularly advantageous embodiments of the subject matter of the invention are recited in the dependent claims and will be explained in more detail in connection with the description of the embodiment with reference to the accompanying drawings.

BRIEF LISTING OF THE SEVERAL VIEWS OF THE DRAWINGS

Figure 2:
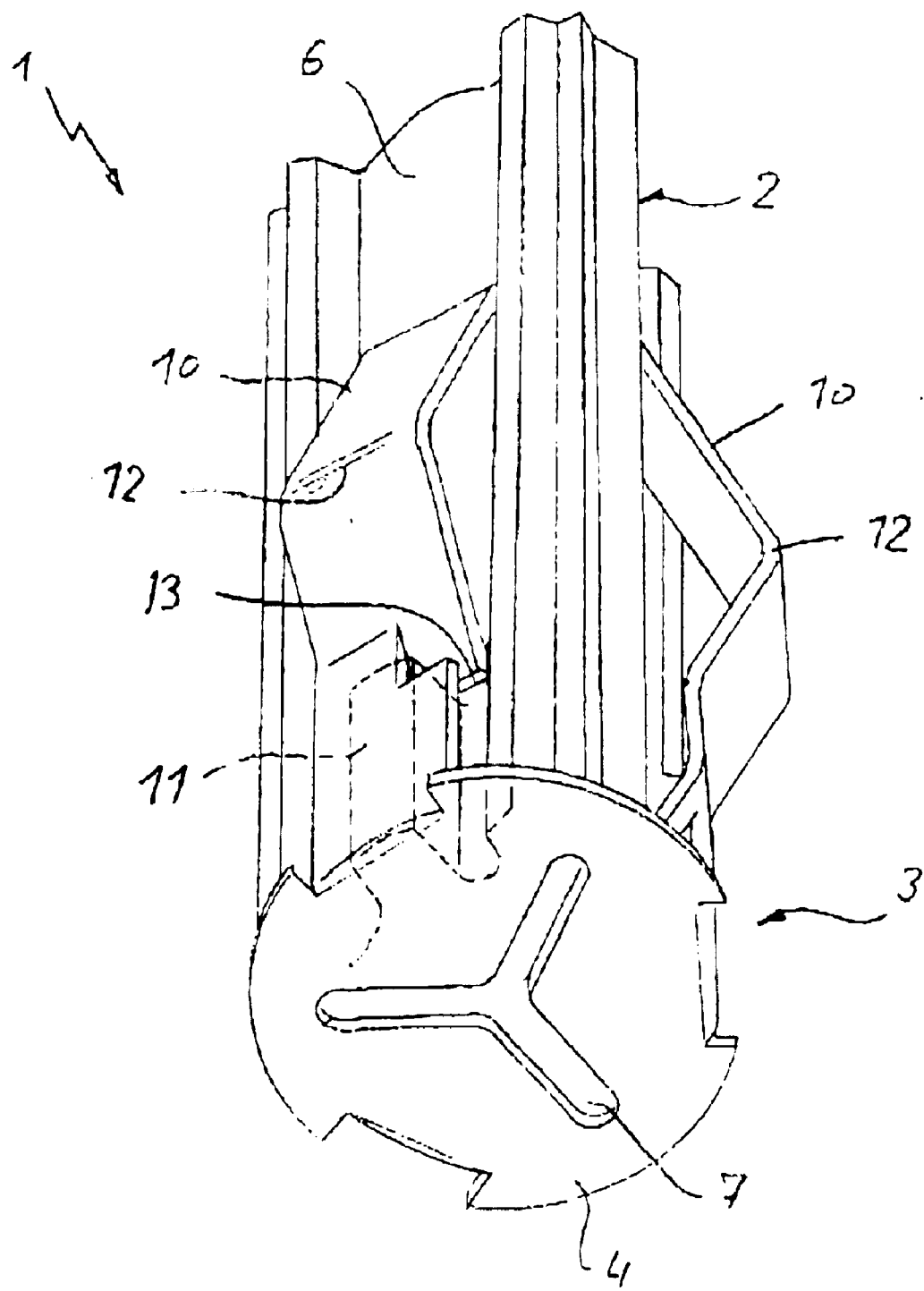
Figure 3:
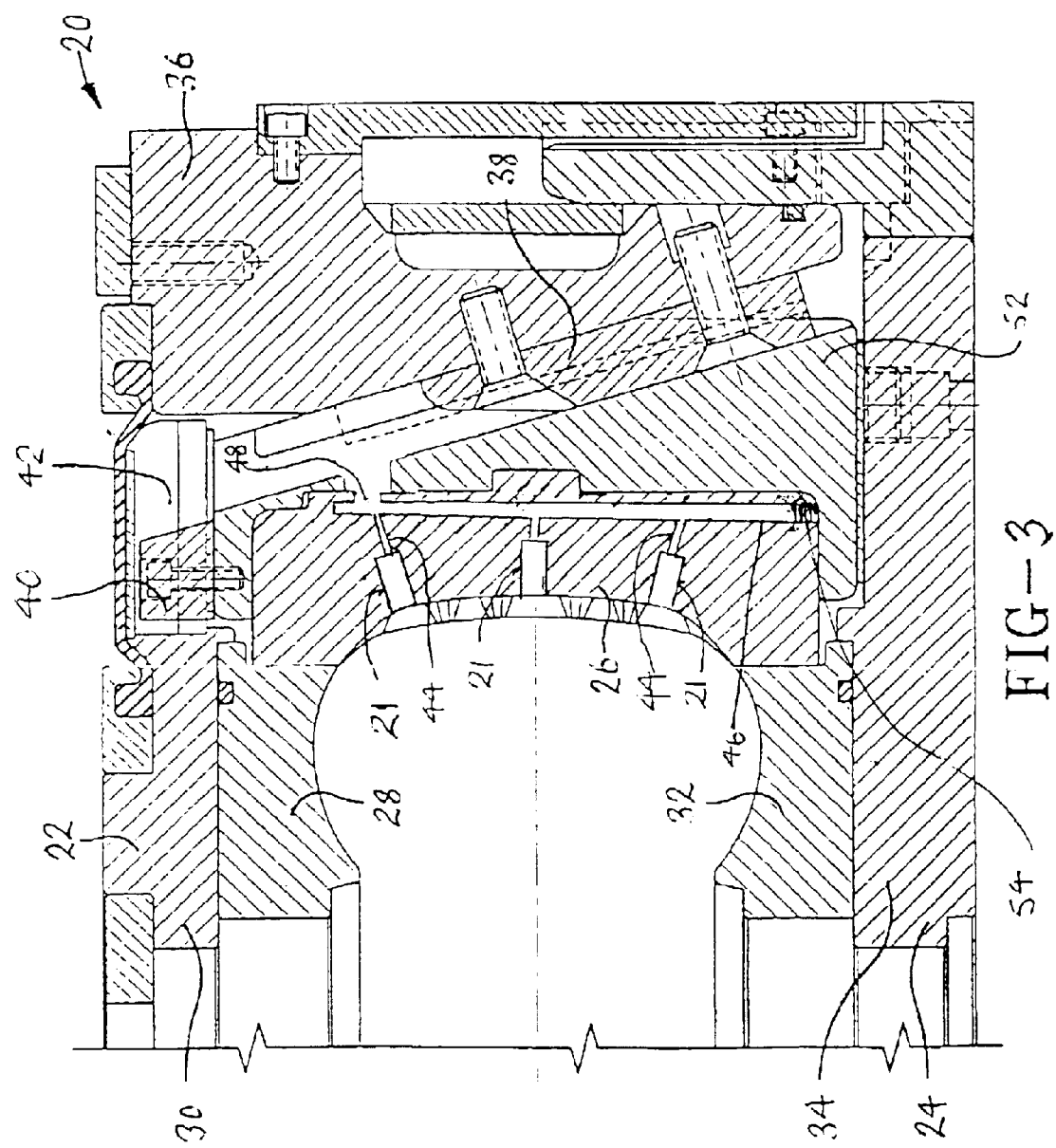

FIG. 1 shows a two-part blocking member in accordance with the invention with the two parts separated, FIG. 2 shows the two-part blocking member of FIG. 1 with the two parts assembled together and FIG. 3 shows a general view of a prior art vulcanization mold with a plurality of two part blocking members in accordance with FIG. 2 incorporated therein, the view being an axial section through one side of the mold.

DETAILED DESCRIPTION OF THE PREFERRED EMBODIMENT

FIGS. 1 and 2 show the best mode of realizing the invention in the form of a blocking member 1 for use in a vulcanization mold. FIG. 1 shows the two-part blocking member 1, which comprises a central body 2 and a sealing part 3, in a perspective representation with the central body 2 and the sealing part 3 being axially aligned but separate from one another.

More specifically the blocking member 1 is adapted to be received in a vent bore and includes the profiled, pin-like central body 2 and the sealing part 3 which can be coupled with this central body 2 as shown in FIG. 2. In the assembled state of FIG. 2 the blocking member can be introduced into a respective vent bore 21 of the vulcanization mold 20 of FIG. 3, which will be described later in more detail. The purpose of the blocking member is to stop the advance of the tire blank material so that it does not enter into the vent passage and form a spue but at the same time to allow air trapped between the advancing tire blank material and the mould to escape through the vent.

The central body 2, which can comprise an injection molded part, has a plurality of clamping ribs 5 which are distributed over its periphery, are triangular in cross-section in the example and extend over the length of the central body 2. The exposed ends of the clamping ribs 5 are preferably made with sharp edges such that on introduction of the blocking member 1 into the corresponding vent bore they dig at least a little into the wall of the vent bore and can thus ensure notch latching by the formation of notches, on the one hand, and a compensation for tolerances, on the other hand.

The central body 2, which is of pin-like form, reduces in diameter between each clamping rib 5 and the next adjacent clamping rib 5 spaced apart from it in the peripheral direction. The reason for this is to preferably form a broadened air through-flow cross-section 6. Furthermore, coupling formations 11 are molded on the central body 2 which cooperate with spring lugs 13 of the sealing part 3. The coupling formations 11 are preferably provided in the region of the end of the central body 2 disposed toward the inner side of the mold.

The sealing part 3, which preferably consists of thin spring steel, includes a disk-like surface region 4 having at least one Y-shaped aperture 7 and spring limbs 10 angled away from this surface region 4. The spring limbs 10 are each provided with a clamping kink 12 in the course of their longitudinal extent. Each spring limb section is provided, between the disk-like surface region 4 and the respective clamping kink 12, with a spring lug 13 cooperating with the coupling projection 11 of the central body 2 and a blocking element 9 which is designed as a sharp edged, acute angled projection which lies at least substantially in the plane of the spring limb 10, but projects sideways.

When the sealing part 3 is pushed onto the central body 2, the spring limbs 12 latch with the coupling projections 11 at the central body 2 via the spring lugs 13, as can be seen in FIG. 2, such that a unit is formed whose components cannot be released from one another after introduction into the corresponding vent bore. After introduction into the respective vent bore, this unit, which forms the blocking member 1, is fixed in an extremely stable manner in this bore and is secured against accidental pulling out during mold removal procedures, since the clamping ribs 5, which simultaneously act as tolerance ribs, provide a secure hold of the blocking member in the vent bore. Moreover, the blocking elements 9 on the spring limbs 10 act as barbs and can counter all forces which arise in use and which act in the direction in which the blocking member 1 can be pulled out from the respective vent bore 21.

It is furthermore of particular advantage, with respect to both the function and the production process that, in accordance with the invention, the disk-like surface region 4 of the sealing part 3 provided with at least one aperture 7 is made substantially planar and cooperates with the likewise substantially planar end face 8 of the central body 2 such that a reliable and problem-free dissipation or discharge of air is ensured. Unevenness between the surface region 4 and the end face 8 brought about by the material and by the production process is surprisingly sufficient to allow the air to be dissipated, which in turn results in the substantial advantage that any disturbing penetration of still liquid material into the air dissipation passages is precluded with even more reliability than was already previously the case. A desired enlarging of the apertures in the surface region 4 is likewise possible without problem while maintaining the advantages described.

Both the venting function and the permanent functional reliability of the blocking members introduced into the vent bores is substantially improved in the manner described.

Turning now to FIG. 3 there can be seen a part section through a vulcanization mold similar to that shown in FIG. 12 of European Patent 0 701 894 but with vent bores 21 incorporated in the tread mold segments 26 (only one shown). The specification of the European patent 0 701 894 gives further details of the vulcanization mold 20 which are incorporated herein by reference. It should be noted that the European Patent relates to a ventless mold which operates by evacuation of the internal space of the mold. In the present case the vulcanization mold is of the same general design but operates without the vacuum system necessary for evacuation of a ventless mold. Instead vent bores 21 are provided in the tread segments 26 through which air trapped between the tire blank and the tread mold segments can escape as the tire blank is expanded into the vulcanization mold in known manner.

The tire mold 20 includes an upper sidewall mold assembly 22, a lower sidewall mold assembly 24 and tread mold segments such as 26. In this embodiment, the upper and lower sidewall assemblies 22, 24 are not in one piece; which is also possible, but instead are comprised of several pieces.

The upper sidewall mold plate 28 abuts and cooperates with upper mold support member 30 while lower sidewall mold plate 32 abuts and cooperates with lower mold support member 34. An actuating ring 36 produces radial movement of the tread mold segments 26. The actuating ring 36 is connected to the tread mold segments 26 via retraction tee bolts 38. Retainer tee members 40 slide within pocket type slots 42.

The blocking members 1 sit in the vent bores 21 with their surface regions 4 flush with the local surface of the respective tread mold segment 26. The vent bores 21 include narrower bore sections 44 and communicate via these with air escape drillings such as 46, 48 in the respective tread mold segment 26 which in turn communicate with an escape drilling 50 in the slide blocks 52 (only one shown) which enable the tread mold segments to be pulled outwardly for cleaning and oiling in known manner. The drilling 46, which acts as a collection manifold for air escaping through the bore sections 44 is closed at its open end by a plug. The tread mold segments 26 can however be designed differently so that the vent bores 21 or the vent bore sections 44 open directly to ambient, which is preferred because it is less costly to realize.

It will be appreciated by those skilled in the art that blanking members 1 inserted into the vent bores 21 prevent the formation of spues or bristles but nevertheless allow the escape of air trapped between the expanding tire blank.

What is claimed is:

1. In a vulcanization mold for the manufacture of technical rubber products, in particular for the manufacture of vehicle tires, the mold comprising a plurality of vent bores in each of which a blocking member (1) is mounted which at least substantially blocks the penetration of (tire) blank material, each said blocking member having a central body (2) which can be fixed in force-transmitting manner in the respective vent bore, and also a sealing part (3) coupled to the central body (2) and having a surface region (4) disposed towards the inner side of the mold which is provided with at least one aperture (7) and which, together with the central body (2), forms at least one angled flow path for the air following the aperture (7), the improvement wherein
the central body (2) of each blocking member is fixed in the respective vent bore, on the one hand, by clamping ribs (5) provided at its outer periphery and cooperating with the bore wall and, on the other hand, by blocking elements (9) which are formed on spring limbs (10) of the sealing part (3) provided for the coupling to the central body (2), said blocking elements having a barb function with respect to a wall of the vent bore (21) in the direction of the inner side of the mold.

2. A vulcanization mold in accordance with claim 1, wherein said clamping ribs (5) which are distributed over the periphery of said central body (2) are designed with an acute angle and are so dimensioned together with said central body (2) that force-transmitting notch connections are formed between said central body (2) and said bore wall while simultaneously effecting a compensation for tolerances.

3. A vulcanization mold in accordance with claim 1, wherein said clamping ribs (5) are spaced apart from one another in a peripheral direction of said central body (2) and wherein said central body (2) is of pin-like form and reduces in diameter between each clamping rib and a next adjacent clamping rib (5) for the formation of a broadened air through-flow cross-section (6), said central body (2) being provided with at least one coupling formation (11) for latching with a spring limb (10) of said sealing part (3).

4. A vulcanization mold in accordance with claim 1, wherein said surface region (4) of said sealing part (3) is of disc-like shape, is substantially planar, has at least one aperture (7) and cooperates with a likewise substantially planar end face (8) of said central body (2), with material unevenness brought about by manufacture ensuring a required air permeability between said surface region (4) and said end face (8).

5. A vulcanization mold in accordance with claim 1, wherein said spring limbs (10) have a longitudinal extent, are angled from a disc-like surface region (4) of said sealing part (3) and are provided with a clamping kink (12) in the course of their longitudinal extent, wherein a lug (13) is provided on at least one said spring limb and latches with a coupling projection (11) of said central body (2) between said disc-like surface region (4) and said clamping kink (12) and wherein at least one blocking element (9) in the form of a sharp edged, acute angled projection is also provided on at least one said spring limb, lies at least substantially in a plane of said spring limb (10) and projects sideways at a position between said disc-like surface region (4) and said clamping kink (12).

6. A blocking member for use in a vent bore (21) of a vulcanization mold (20) for the manufacture of technical rubber products, in particular for the manufacture of vehicle tires, said blocking member (1) serving to at least substantially block the penetration of (tire) blank material into a said vent bore, the blocking member having a central body (2) which can be fixed in force-transmitting manner in the respective vent bore, and also a sealing part (3) coupled to said central body (2) and having a surface region (4) disposable in use towards an inner side of a said mold which is provided with at least one aperture (7) and which, together with said central body (2), forms at least one angled flow path for the air following the aperture (7), said central body (2) being provided with clamping ribs (5) at its outer periphery which are adapted to cooperate with a wall of a vent bore and said sealing part (3) being provided with spring limbs (10) for the coupling of said sealing part to said central body (2), there being at least one blocking elements (9) formed on each said spring limb (10), said blocking elements each having a barb adapted for engagement with a wall of a said vent bore (21).

7. A blocking member in accordance with claim 6, wherein said clamping ribs (5) which are distributed over the periphery of said central body (2) are designed with an acute angle and are so dimensioned together with said central body (2) that force-transmitting notch connections are formed between said central body (2) and a said bore wall while simultaneously effecting a compensation for tolerances.

8. A blocking member in accordance with claim 6, wherein said clamping ribs (5) are spaced apart from one another in a peripheral direction of said central body (2) and wherein said central body (2) is of pin-like form and reduces in diameter between each clamping rib and a next adjacent clamping rib (5) for the formation of a broadened air through-flow cross-section (6), said central body (2) being provided with at least one coupling formation (11) for latching with a spring limb (10) of said sealing part (3).

9. A blocking member in accordance with claim 6, wherein said surface region (4) of said sealing part (3) is of disc-like shape, is substantially planar, has at least one aperture (7) and cooperates with a likewise substantially planar end face (8) of said central body (2), with material unevenness brought about by manufacture ensuring a required air permeability between said surface region (4) and said end face (8).

10. A blocking member in accordance with claim 6, wherein said spring limbs (10) have a longitudinal extent, are angled from a disc-like surface region (4) of said sealing part (3) and are provided with a clamping kink (12) in the course of their longitudinal extent, wherein a lug (13) is provided on at least one said spring limb and latches with a coupling projection (11) of said central body (2) between said disc-like surface region (4) and said clamping kink (12) and wherein at least one blocking element (9) in the form of a sharp edged, acute angled projection is also provided on at least one said spring limb, lies at least substantially in a plane of said spring limb (10) and projects sideways at a position between said disc-like surface region (4) and said clamping kink (12).

* * * * *